United States Patent Office 3,283,862
Patented Nov. 8, 1966

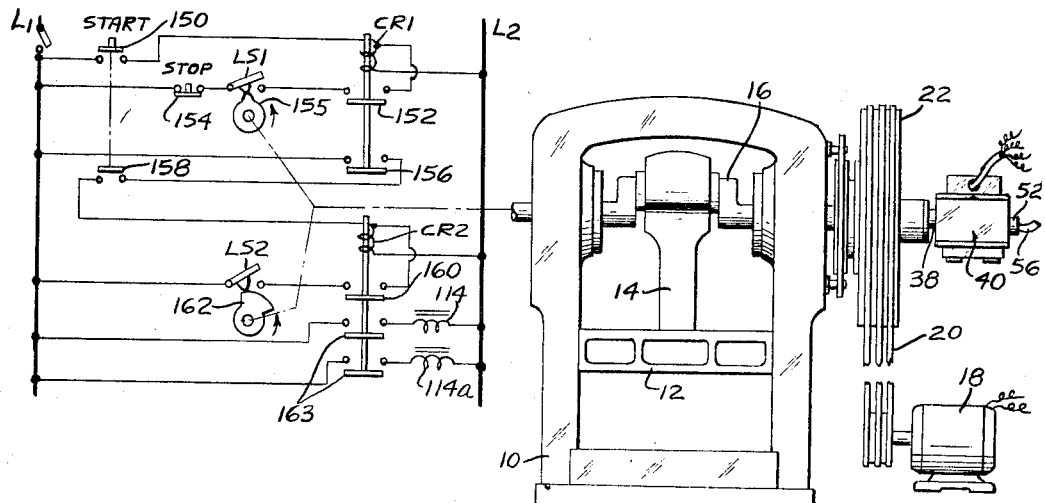
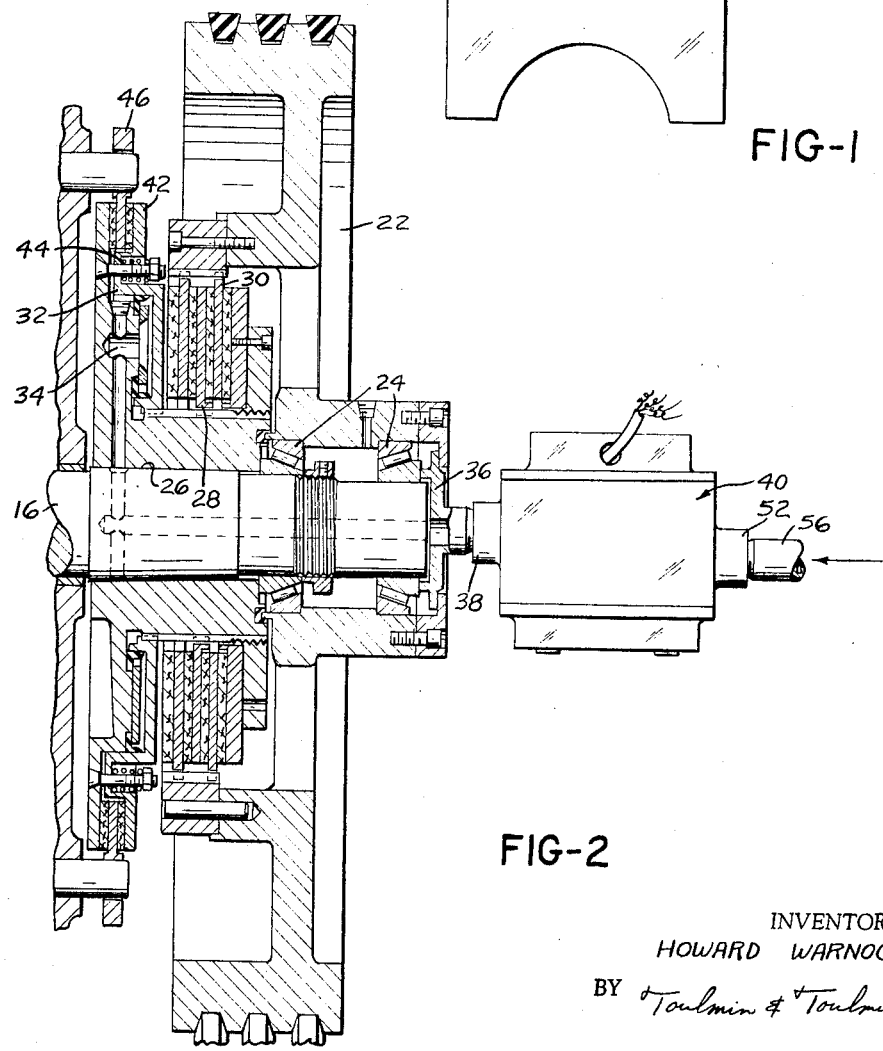
FIG-1
FIG-2
INVENTOR.
HOWARD WARNOCK
BY Toulmin & Toulmin
ATTORNEYS

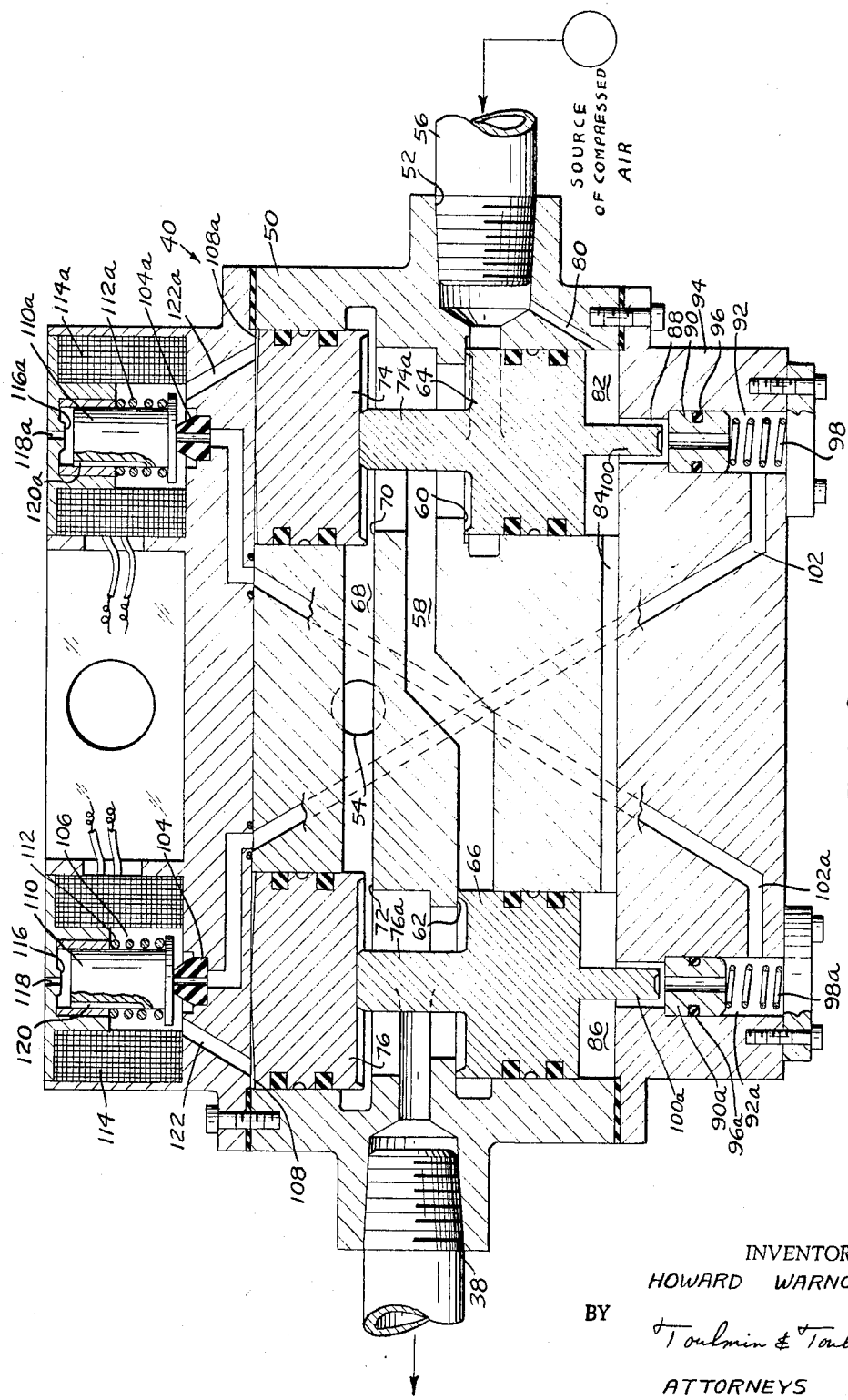

3,283,862
SECONDARY PILOT CONTROL VALVE
Howard Warnock, Minster, Ohio, assignor to The Minster Machine Company, Minster, Ohio, a corporation of Ohio
Filed Apr. 10, 1964, Ser. No. 358,814
13 Claims. (Cl. 192—18)

This invention relates to a control arrangement for a press, and in particular, to a novel control valve arrangement for controlling the energization and de-energization of a fluid operated clutch-brake for a press, and to the means of controlling such a unit.

Mechanical presses and the like having fluid operated clutches and brakes are known, and it is also known to combine a clutch and brake into a single unit, and to so construct the unit that a supply of pressure fluid to the unit will engage the clutch while simultaneously disengaging the brake while exhausting of pressure fluid from the unit will bring about opening of the clutch and setting of the brake. Units of this nature are used on mechanical presses and press brakes and shears and similar devices characterized principally in having a reciprocating member driven from a rotary power source and wherein the reciprocating member is usually required to permit one working stroke and then come to a halt.

Heretofore, the control of the supply of fluid to the clutch brake unit of such an installation has been accomplished by way of valve means under the control of an electric operator. Single valve means may be employed, but it has become the practice to employ at least two valve means in multiple to reduce the possibility of failure of the control which could lead to a dangerous repeat stroke of the press or other driven devices.

It is also known in connection with the electrical systems for controlling the valves to provide such interlocks that if either valve fails to turn following a shifting movement thereof, recycling of the press will be prevented. The aforementioned control and safety arrangements in general work satisfactorily except that the systems are expensive and complex, and failure is more likely to occur from failure of individual electrical components in the electric control system than in other parts of the structure.

With the foregoing in mind, a primary object of the present invention is the construction of a control arrangement for a press or the like having a fluid operated clutch-brake unit in which the utmost in safety of operation is realized while, at the same time, the system is relatively simple and inexpensive.

Another object of this invention is the provision of a control arrangement for a fluid operated clutch-brake unit in which the necessary electrical auxiliaries for the system are reduced to a minimum.

A still further object of the present invention is the provision of a control valve arrangement and the means of operating the same, especially for controlling the clutch-brake unit of a press or the like in which pneumatic means are provided to prevent recycling of the press upon the failure of any part of the valve structure to operate properly.

These and other objects and advantages of this invention will become more apparent upon reference to the following specification taken in connection with the accompanying drawings, in which:

FIGURE 1 is a somewhat diagrammatic view of a press having a fluid operated clutch-brake unit associated therewith under the control of a valve arrangement according to the present invention and showing the electric control circuit including press driven cams associated with the press;

FIGURE 2 is a vertical sectional view showing the flywheel of the press and the clutch-brake unit associated therewith with the valve of the present invention illustrated in elevation and connected with the clutch-brake unit, and FIGURE 3 is a sectional unit through the control valve according to the present invention drawn at enlarged scale.

Referring to the drawings somewhat more in detail, the press arrangement in FIGURE 1 comprises a press frame 10 and slidably mounted thereon is a press slide 12 connected by connecting rod means 14 with a rotary crankshaft 16. The crankshaft is adapted for being driven by power derived from an electric motor 18 which is drivingly connected by belt means 20 with flywheel 22 of the press that is rotatable on the crankshaft.

As will be seen in FIGURE 2, flywheel 22 is rotatably supported on crankshaft 16 by anti-friction bearing means 24 so that the flywheel can rotate freely on the crankshaft when slide 12 is not reciprocating.

For drivingly connecting the flywheel with the crankshaft to rotate the crankshaft, there is fixed to the crankshaft a hub portion 26 to which is splined clutch plate means 28. These clutch plate means are adapted for cooperation with clutch plate means 30 splined to flywheel 22. The clutch plate means are adapted for being pressed into driving engagement with each other by annular piston means 32 non-rotatably carried by hub portion 26 and which can be forced rightwardly to clamp the clutch plates together by a supply of pressure fluid thereto via passage means 34 which leads along the crankshaft and through rotary fluid joint 36 to the outlet port 38 of control valve assembly 40.

Annular piston 32 has connected therewith a brake plate 42 which, when fluid is exhausted from piston 32, is forced by spring means 44 into braking engagement with a brake plate 46 carried by the press frame. It will be seen that when annular piston 32 is subjected to pressure, the flywheel will be clutched to the crankshaft while the crankshaft is released from the frame, while exhausting of fluid from piston 32 will bring about disengagement from the clutch and braking of the crankshaft to the frame. The operation of the clutch and brake unit is substantially conventional, and units of this nature are shown in prior U.S. patents as, for example, Patents 2,667,248 and 2,745,338.

The valve according to the present invention is shown in detail in FIGURE 3, wherein it will be seen that the valve comprises a body 50 having, in addition to the aforementioned outlet port 38, an inlet port 52 and an exhaust port 54.

Connected with inlet port 52 is conduit means 56 which supplies air under pressure to the valve. Within the valve is a first passage means 58 for conveying pressure fluid from inlet port 52 to outlet port 38. This passage has a seat 60 adjacent inlet port 52 and a seat 62 adjacent outlet port 38. A valve member 64 is reciprocably mounted in the valve body and is adapted for fitting on the upstroke side of seat 60, while another valve member 66 also is reciprocably mounted in the body and is adapted for fitting on the upstream side of seat 62.

The valve body furthermore comprises an exhaust passage 68 leading from the downstream side of seat 60 to the downstream side of seat 62 and itself comprising the seat 70 at the end adjacent inlet port 52 and a seat 72 adjacent outlet port 38.

Valve member 74 is adapted for engaging seat 70 and a valve member 76 is adapted for engaging seat 72. Valve members 74 and 76 are separate from valve members 64 and 66, and are also somewhat larger in diameter. It will be noted that the exposed areas of valve members 74 and 76 inwardly from the seats which they engage are larger than the exposed areas of valve members 64 and 66 inwardly from their respective seats.

The valve body also has passage 80 leading from inlet port 52 to the chamber 82 underneath valve member 64. Chamber 82 is communicated by passage means 84 with a chamber 86 on the lower side of valve member 66. It will be apparent that pressure in inlet port 52 will pressurize both chambers 82 and 86 when compressed air is present at inlet 52.

Chamber 82 communicates via a passage 88 with the upper end of a tubular member 90 reciprocably mounted in a bore 92 in the lower closure member 94 of the valve body. Member 90 is sealed by O-ring 96 to its bore and is yieldable downwardly in the bore against the thrust of a spring 98. A rod-like projection 100 on valve member 64 is adaptable for engaging the upper end of member 90 when the valve member moves downwardly and upon engaging the member 90 the passage from chamber 82 through member 90 will be interrupted and will remain interrupted until valve member 64 again shifts upwardly.

The lower portion of bore 92 in which member 90 is reciprocable is connected by a passage 102 extending diagonally through the valve body and communicating with the passage extending through valve seat member 104. The passage through seat member 104 communicates with a chamber 106 which, in turn, communicates with chamber 108 at the upper end of valve member 76. Seat member 104 is normally sealingly engaged by a valve member 110 spring urged into closing position by a spring 112. This member also forms the armature for a solenoid 114 which, when energized, will move member 110 upwardly into engagement with a seat 116 pertaining to exhaust passage 118. Groove means 120 extending along member 110 connects chamber 106 with passage 118 when the valve member is in engagement with seat 104 and when solenoid 114 is energized to move member 110 upwardly into engagement with seat 116, chamber 106 is communicated with the passage through seat member 104. Chamber 106 is continuously communicated with chamber 108 by way of passage 122 in the valve body.

Pertaining to valve member 66 is an identical arrangement to that above described and the same reference numerals have been applied thereto except for the addition of a subscript *a*.

In summary, the valve body 50 has a first valve means and a second valve means. The first valve means has a first portion 66 which works in cooperation with and upstream of a first valve seat 62, and a second portion 76 which works in cooperation with and downstream of a second valve seat 72. Likewise, the second valve means has a first portion 64 which works in cooperation with and upstream of a first valve seat 60, and a second portion 74 which works in cooperation with and downstream of a second valve seat 70. The first and second valve means 66, 76, 64, 74 have a first or upward position, and a second or downward position. The body member 50 also includes third valve means 90a, 100a associated with the first valve means, and fourth valve means 90, 100 associated with the second valve means. These third and fourth valve means 90a, 100a, and 90, 100 are connected by passages 102a, 102 to sixth and fifth valve means 104a, 110a and 104, 110 respectively. Each of the first and second valve means have respective first and second fluid operable means. The first valve means 66, 76 have first fluid operable means 86 which tend to move the first valve means to the first or upward position, and second fluid operable means 108 which tend to move the first valve means to the second or downward position. The second valve means 64, 74 have first fluid operable means 82 which tend to move the second valve means to the first or upward position, and second fluid operable means 108a which tend to move the second valve means to the second or downward position.

*Operation*

In operation, the valve structure is normally at rest with the valve members in the position illustrated, and outlet port 38 is connected with exhaust port 54 so that the clutch-brake unit is exhausted and the crankshaft is braked stationarily to the press frame.

With inlet port 52 under pressure, pressure is standing beneath valve members 64 and 66 in the chambers 82 and 86, and therefrom through passages 102 and 102a to seat members 104 and 104a. Upon energization of solenoids 114 and 114a, members 110 and 110a will move upwardly into engagement with seats 116 and 116a and the passages 102 and 102a will be communicated respectively with chambers 108 and 108a. The compressed fluid in chambers 108 and 108a and the passages leading therefrom will drive valve members 74 and 76 downwardly into engagement with their seats 70 and 72 while simultaneously valve members 64 and 66 will be moved downwardly away from the seats 60 and 62. The connection with outlet port 38 with exhaust is thus interrupted, and instead pressure fluid is supplied from inlet port 52 through passage 58 to outlet port 38 and the clutch-brake unit is thereby pressurized and the press carries out an operative cycle.

As will be seen hereinafter, the press will normally cause de-energization of solenoids 114 and 114a at about the end of an operative cycle, and this will permit the members 110 and 110a to be pushed downward and back against their seat members 104 and 104a whereby chambers 108 and 108a will be connected with exhaust. Exhausting of chambers 108 and 108a will permit upward movement of valve members 74 and 76, and pressure being delivered to the space beneath valve members 64 and 66 will also cause them to move upwardly so that the valve structure is returned in its FIGURE 3 position and the press stops.

Should any part of the valve structure fail to return to its FIGURE 3 position, a build-up of shifting pressure in chambers 82 and 86 will be prevented and it will be possible to recycle the press. For example, if either member 110 or 110a fails to engage its seat member, the shifting pressure will be drained off to exhaust. On the other hand, if either of valve members 64 or 66 fails to shift upwardly, a supply of shifting pressure fluid through the tubular member 90 or 90a to the other valve members will be prevented and no shifting thereof will occur when the solenoids are again energized. Similarly, if either of valve members 74 or 76 fail to shift upwardly, rod-like abutment element 74a or 76a pertaining to the associated one of valve members 64 or 66 will prevent that particular valve member from shifting upwardly, whereby the pertaining one of members 90 or 90a will be prevented from passing shifting fluid therethrough.

Upon the failure of either one of members 110 or 110a from moving upwardly upon energization of the pertaining solenoid, or because the pertaining solenoid is defective, the pertaining valve member will shift downwardly and this will maintain a passage to exhaust from one end or the other of passage 58 and thereby prevent the effective supply of pressure fluid to outlet port 38.

It will therefore be seen that by simple pneumatic means the entire operation of the valve structure is made completely safe and recycling of the press upon the failure of any part of the valve structure is insured.

*Electric control circuit*

The solenoids 114 and 114a are controlled by the electric circuit shown schematically in FIGURE 1. Circuit power lines L1 and L2 have connected therebetween a coil or relay CR1 which direct a normally open start switch 150. A holding circuit for relay CR1 is established through its upper blade 152, a normally open switch LS1 and a normally closed stop switch 154. A crankshaft operated cam 155 permits switch LS1 to drop closed shortly after the crankshaft commences rotating.

A second blade 156 on relay CR1 and a second normally open blade 158 of start switch 150 are in series with the actuating coil of a second relay CR2 so that upon closing of switch 150 and relay CR1 relay CR2 will be closed. Relay CR2 has a holding circuit through its blade 160 and a normally open switch LS2. Switch LS2 is controlled by a crankshaft operated cam 162 which permits switch LS2 to drop closed after the crankshaft has commenced rotating, and while start switch 150 is held closed.

Other blade means 163 of relay CR2 are in series with solenoids 114 and 114a. In operation, switch 150 is depressed and this will pick up relay CR1 which will, in turn, pick up relay CR2. After on revolution of the crankshaft, switches LS1 and LS2 close, and switch 150 may be released and the crankshaft will continue through one rotation. At the end of about one rotation of the crankshaft, switches LS1 and LS2 will be opened and drop out their pertaining relays and the press will come to a halt.

It will be understood that this invention is susceptible to modification in order to adapt it to different usages and conditions; and accordingly, it is desired to comprehend such modifications within this invention as may fall within the scope of the appended claims.

I claim:

1. A control valve arrangement comprising body means having a pressure inlet port, a pressure outlet port, and an exhaust port and also having passage means interconnecting said ports; first and second valve means in said body means each having a first position in which it establishes an effective connection from said outlet port to said exhaust port and each having a second position to which both must be moved to establish an effective connection from said inlet port to said outlet port, first fluid operable means for each valve means responsive to pressure for urging the respective valve means toward said first position, second fluid operable means for each valve means responsive to fluid pressure to urge the respective valve means toward said second position, means for supplying fluid to said first and second fluid operable means, and means operatively positioned in said body means and responsive to the failure of either of said first and second valve means to move to its said first position for preventing the supply of pressure fluid to said second fluid operable means of the other valve means.

2. A control valve arrangement comprising body means having a pressure inlet port, a pressure outlet port, and an exhaust port and also having passage means interconnecting said ports; first and second valve means in said body means each having a first position which establishes an effective connection from said outlet port to said exhaust port and also having a second position to which both must be moved to establish an effective connection from said inlet port to said outlet port, first fluid operable means for each valve means responsive to pressure for urging the respective valve means toward said first position, second fluid operable means for each valve means responsive to fluid pressure to urge the respective valve means toward said second position, means for supplying fluid to said fluid operable means, passage means for conveying pressure fluid from said first fluid operable means to said second fluid operable means, and means positioned in said body means and operable upon failure of either of said first and second valve means to move to said first position for interrupting the supply of pressure fluid to the second fluid operable means of the other valve means.

3. A control valve arrangement comprising body means having a pressure inlet port, a pressure outlet port, and an exhaust port and also having passage means interconnecting said ports; first and second valve means in said body means each having a first position into which either can be moved to establish an effective connection from said outlet port to said exhaust port and also having a second position into which both must be moved to establish an effective connection from said inlet port to said outlet port, first fluid operable means for each valve means responsive to pressure for urging the respective valve means toward said first position, second fluid operable means for each valve means responsive to fluid pressure to urge the respective valve means toward said second position, means for supplying an elastic pressure fluid medium to said first fluid operable means, passage means for conveying pressure fluid from each of the said first fluid operable means to said second fluid operable means, and means operatively positioned in said body means and responsive to the failure of either of said first and second valve means to move into its said first position for interrupting the passage means leading to the second fluid operable means pertaining to the other valve means.

4. A control valve arrangement comprising body means having a pressure inlet port, a pressure outlet port, and an exhaust port and also having passage means interconnecting said ports; first and second valve means in said body means each having a first position into which either can be moved to establish an effective connection from outlet port to said exhaust port and also having a second position into which both must be moved to establish an effective connection from said inlet port to said outlet port, first fluid operable means for each valve means responsive to pressure for urging the respective valve means toward said first position, second fluid operable means for each valve means responsive to fluid pressure to urge the respective valve means toward said second position, means for supplying an elastic pressure fluid to said first fluid operable means, a passage means leading from each said first fluid operable means to the second fluid operable means, and a valve in each passage means operated into closed position by movement of the valve means pertaining to said passage means into its said second position for interrupting the supply of pressure fluid to the second fluid operable means pertaining to the said passage means.

5. A control valve arrangement comprising body means having a pressure inlet port, a pressure outlet port, and an exhaust port and also having passage means interconnecting said ports; first and second valve means in said body means each having a first upwardly position into which either can be moved to establish an effective connection from outlet port to said exhaust port and also having a second position into which both must be moved downwardly to establish an effective connection from said inlet port to said outlet port, first fluid operable means for each valve means responsive to pressure for urging the respective valve means toward said first position, second fluid operable means for each valve means responsive to fluid pressure to urge the respective valve means toward said second position, means for supplying an elastic pressure fluid to said first fluid operable means, a passage leading from each said first fluid operable means to the second fluid operable means a third and fourth valve means adapted to be moved into a closed position by downward movement of the said first and second valve means, and fifth and sixth valve means for controlling each passage and connecting the second fluid operable means to exhaust and movable into position to interrupt the connection of the second fluid operable means to exhaust and to connect it instead to the said passage.

6. A control valve arrangement comprising body means having a pressure inlet port, a pressure outlet port, and an exhaust port and also having passage means interconnecting said ports; first and second valve means in said body means each having a first upwardly position into which either can be moved to establish an effective connection from outlet port to said exhaust port and also having a second position into which both must be moved downwardly to establish an effective connection from said inlet port to said outlet port, first fluid operable means for each valve means responsive to pressure for urging the respective valve means toward said first position, second fluid operable means for each valve means responsive to fluid pressure to urge the respective valve means toward said second position, means for supplying an elastic pressure fluid to said first fluid operable means, a passage leading from each said first fluid operable means to the second fluid operable means a third and fourth valve means adapted to be moved into a closed position by downward movement of the said first and second valve means, and fifth and sixth valve means for controlling each passage and connecting the second fluid operable means to exhaust and movable into position to interrupt the connection of the pertaining second fluid operable means to exhaust and to connect it instead to the said passage, said third and fourth valve means having solenoid operators, and means for energizing and de-energizing said solenoid operators in unison.

7. In a compound valve arrangement: valve body means having an inlet and an outlet, a passage in the valve body leading from the inlet to the outlet and having a pair of first valve seats therein, first and second valve means in said valve body having first portions on the upstream side of said first seats, other passage means leading from the downstream sides of said seats to an exhaust port and having second valve seats therein in alignment with said first seats, said valve means also including second portions on the downstream sides of said second seats, said valve means having a first upwardly position wherein said first portions engage said first seats and a second downwardly position wherein said second portions engage said second seats, first fluid operable means connected to said valve means responsive to fluid pressure for urging the said valve means into said first position, second fluid operable means connected to said valve means responsive to pressure for urging the valve means into said second position, means for supplying an elastic fluid medium to said first fluid operable means, a pair of passages each having an inlet end connected to the first fluid operable means and leading to the second fluid operable means, a third and fourth valve means at the inlet end of each said passage operable into closed position by the said first and second valve means respectively when the latter moves into its said second position, and a fifth and sixth valve means in each passage having a normal position interrupting the said passage while connecting the said second fluid operable means to said exhaust port and being movable into another position to interrupt the connection of the said second fluid operable means to exhaust while connecting the passage to said second fluid operable means, each said second fluid operable means being larger in effective area than the first fluid operable means pertaining to the same valve means.

8. A compound valve arrangement according to claim 7 which includes spring means biasing each said fifth and sixth valve means toward its normal position and a solenoid operator for each said fifth and sixth valve means energizable for moving the said fifth and sixth valve means into its said other position.

9. A compound valve arrangement according to claim 8 in which the said first and second portions of said first and second valve means are separate parts, and elements of abutment means on said first and second portions operable for causing either portion of either of said first and second valve means to be moved off its pertinent seat when the other portion thereof is moved into engagement with its pertaining seat.

10. A compound valve arrangement according to claim 7 in which said third and fourth valve means includes a sleeve-like member reciprocably mounted in the valve body means, and a stem on the pertaining one of said first and second valve means engageable with the end of said member for closing the bore therethrough when the said one valve means moves into its said second position.

11. In a control valve having a valve body with an inlet port, an outlet port, and an exhaust port, a pair of valves in said body each having a first position in which either can be moved upwardly to cause effective connection of said outlet port ot said exhaust port and a second position into which both must be moved downwardly to cause effective connection of said inlet port to said outlet port, first and second fluid operable means pertaining to each of said valves respectively operable when effective for urging said valves toward their respective first and second positions, a source of pressure fluid for supplying said fluid operable means, means selectively operable for controlling the supply of fluid from said source to said fluid operable means to make said fluid operable means selectively effective and including effecting connection of said source to said second fluid operable means simultaneously and means operated by each valve when moved to its said second position to interrupt the connection of said source to the said second fluid operable means of the other valve.

12. A press having a frame, a slide in the frame, a crankshaft rotatable in the frame and connected to the slide, a flywheel rotatable on the crankshaft, a clutch-brake unit operable upon the supply of pressure fluid thereto to clutch the flywheel to the crankshaft and operable upon the exhausting of pressure fluid therefrom to brake the crankshaft to the frame, a source of compressed air, a compound valve connecting the source of compressed air to said clutch-brake unit, said valve comprising first and second valve means each having a first upwardly position in which either will exhaust said clutch-brake unit and a second position into which both must be moved downwardly to supply compressed air to said clutch-brake unit, each valve means having first fluid operable means connected to said source and biasing said valve means toward the said first position thereof, second and larger fluid operable means for each valve means responsive to pressure for biasing said valve means toward the said second position thereof, a control valve for each second fluid operable means having a first position for exhausting said second fluid operable means and a second position for connecting the respective second fluid operable means to the first fluid operable means of the other valve means, means responsive to the movement of each valve means into its second position for interrupting the connection from the first fluid operable means thereof to the second fluid operable means of the other valve means, electrical means energizable for moving said control valves into their said second position, and means operated by the crankshaft for de-energizing said electrical means in a predetermined rotated position of the crankshaft.

13. A press having a frame, a slide in the frame, a crankshaft rotatable in the frame and connected to the slide, a flywheel rotatable on the crankshaft, a clutch-brake unit operable upon the supply of pressure fluid thereto to clutch the flywheel to the crankshaft and operable upon the exhausting of pressure fluid therefrom to brake the crankshaft to the frame, a source of compressed air, a compound valve connecting the source of compressed air to said clutch-brake unit, said valve comprising first and second valve means each having a first upwardly position in which either will exhaust said clutch-brake unit and a second position into which both must be moved downwardly to supply compressed air to said clutch-brake unit, each valve means having first fluid operable means connected to said source and biasing said valve means toward the said first position thereof, second and larger fluid operable means for each valve means responsive to pressure for biasing said valve means toward the said second position thereof, a first control valve for each said second fluid operable means having a first position for exhausting said second fluid operable means and a second position for connecting said second fluid operable means to said source of compressed air, a normally open second control valve upstream of each said first control valve, means responsive to movement of each valve means into its said second position for closing the said second control valve of the other valve means, electrical means energizable for moving said control valves into their said second position, and means operated by the crankshaft for de-energizing said electrical means in a predetermined rotated position of the crankshaft.

References Cited by the Examiner
UNITED STATES PATENTS

| | | | |
|---|---|---|---|
| 2,636,581 | 4/1953 | Bilter | 192—18.1 |
| 3,084,676 | 4/1963 | Herion | 137—596.16 X |
| 3,135,289 | 6/1964 | Jordon | 137—596.16 |
| 3,139,109 | 6/1964 | Ruchser | 137—596.16 |

DAVID J. WILLIAMOWSKY, *Primary Examiner.*

DON A. WAITE, *Examiner.*

B. W. WYCHE III, *Assistant Examiner.*